(12) United States Patent
Hayashi et al.

(10) Patent No.: US 11,945,891 B2
(45) Date of Patent: Apr. 2, 2024

(54) SPEAKER HAVING AN ADHESIVE COMPOSITION

(71) Applicant: DENKA COMPANY LIMITED, Tokyo (JP)

(72) Inventors: Hideki Hayashi, Shibukawa (JP); Yoshitsugu Goto, Tokyo (JP); Chiaki Takano, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 374 days.

(21) Appl. No.: 16/628,899

(22) PCT Filed: Sep. 19, 2018

(86) PCT No.: PCT/JP2018/034680
§ 371 (c)(1),
(2) Date: Jan. 6, 2020

(87) PCT Pub. No.: WO2019/059239
PCT Pub. Date: Mar. 28, 2019

(65) Prior Publication Data
US 2020/0231726 A1     Jul. 23, 2020

(30) Foreign Application Priority Data

Sep. 20, 2017  (JP) ................................. 2017-179741

(51) Int. Cl.
*C08F 220/20* (2006.01)
*C08F 220/14* (2006.01)
(Continued)

(52) U.S. Cl.
CPC .......... *C08F 220/20* (2013.01); *C08F 220/14* (2013.01); *C08F 222/102* (2020.02);
(Continued)

(58) Field of Classification Search
CPC .... C08F 220/14; C08F 220/12; C08F 220/18; C08F 220/1802; C08F 220/1803;
(Continued)

(56) References Cited

U.S. PATENT DOCUMENTS

| 5,110,513 A | 5/1992 | Puvilland ........................ 264/19 |
| 2005/0009946 A1* | 1/2005 | Oguri ......................... C09J 4/00 |
| | | 522/184 |

(Continued)

FOREIGN PATENT DOCUMENTS

| JP | H 02-501637 A | 6/1990 |
| JP | H 04-239004 A | 8/1992 |

(Continued)

OTHER PUBLICATIONS

Notification of Transmittal of Translation of the International Preliminary Report on Patentability dated Sep. 19, 2018, issued by the International Bureau of WIPO in corresponding application PCT/JP2018/034680.

*Primary Examiner* — Ling Siu Choi
*Assistant Examiner* — David L Miller
(74) *Attorney, Agent, or Firm* — Stein IP, LLC (57) ABSTRACT

A composition having excellent curability and adhesive bonding ability is provided. A composition, comprising the following components (1) to (5): (1) a polymerizable vinyl monomer containing 10 to 70 parts by mass of (1-1), 10 to 60 parts by mass of (1-2), and 10 to 60 parts by mass of (1-3) based on 100 parts by mass of (1) the polymerizable vinyl monomer, in which (1-1) is a (meth)acrylic monomer represented by the formula (A) Formula (A) Z—O—$R^1$ (wherein, Z represents a (meth)acryloyl group, and $R^1$ represents an alkyl group.), (1-2) is a (meth)acrylic monomer represented by the formula (B) (wherein, Z and Z' represent a (meth)acryloyl group, and $R^2$ and $R^{2'}$ represent an alkylene group; $R^2$ and $R^{2'}$ may be the same as or
(Continued)

different from one another; $R^3$ and $R^{3'}$ represent a hydrogen atom, or an alkyl group having 1 to 4 carbon atoms; $R^3$ and $R^{3'}$ may be the same as or different from one another; m and n represent an average number of moles of alkylene oxide added (proportion of alkylene oxide added)), (1-3) is a (meth)acrylic monomer that is a (meth)acrylic acid ester of a polyhydric alcohol; (2) a thermal radical polymerization initiator; (3) a photo-radical polymerization initiator; (4) an aromatic amine and/or pyridine derivative; and (5) an organic metal salt.

3 Claims, 1 Drawing Sheet (51) Int. Cl.
| | | |
|---|---|---|
| | *C08F 222/10* | (2006.01) |
| | *C08K 5/18* | (2006.01) |
| | *C09J 4/06* | (2006.01) |
| | *C09J 11/06* | (2006.01) |
| | *H04R 1/00* | (2006.01) |
| | *C08K 5/098* | (2006.01) |

(52) U.S. Cl.
CPC ................ *C08K 5/18* (2013.01); *C09J 4/06* (2013.01); *C09J 11/06* (2013.01); *H04R 1/00* (2013.01); *C08K 5/098* (2013.01)

(58) Field of Classification Search
CPC .......... C08F 220/1804; C08F 220/1805; C08F 220/1806; C08F 220/1807; C08F 220/1808; C08F 220/1809; C08F 220/1811; C08F 220/1812; C08F 220/1818; C08F 220/20; C08F 22/12; C08F 22/102; C08F 22/103; C08F 22/1035; C08F 22/104; C08F 22/1045; C08F 22/105; C08F 22/1055; C08F 22/1025; C08F 222/12; C08F 222/102; C08F 222/103; C08F 222/1035; C08F 222/104; C08F 222/1045; C08F 222/105; C08F 222/1055; C08F 222/1025; C08K 5/098; C08K 5/18
See application file for complete search history.

(56) References Cited

U.S. PATENT DOCUMENTS

| | | | |
|---|---|---|---|
| 2005/0182148 A1* | 8/2005 | Gaud | A61K 6/20 |
| | | | 522/1 |
| 2007/0276059 A1* | 11/2007 | Lewandowski | A61K 6/896 |
| | | | 523/116 |
| 2011/0190414 A1* | 8/2011 | Hisha | C09J 155/02 |
| | | | 525/193 |
| 2015/0044490 A1 | 2/2015 | Kurimura et al. | 428/522 |
| 2016/0100254 A1* | 4/2016 | Bae | H04R 7/26 |
| | | | 381/354 |

FOREIGN PATENT DOCUMENTS

| | | |
|---|---|---|
| JP | H 08-209058 A | 8/1996 |
| JP | 2000-159835 A | 6/2000 |
| JP | 2004-43427 A | 2/2004 |
| WO | WO 2010/041710 A1 | 4/2010 |
| WO | WO 2013/039226 A1 | 3/2013 |

* cited by examiner

SPEAKER HAVING AN ADHESIVE COMPOSITION

CROSS-REFERENCE TO RELATED APPLICATIONS

This application is a national stage of International Application No. PCT/JP2018/034680, filed Sep. 19, 2018, which claims the benefit of Japanese Application No. 2017-179741, filed Sep. 20, 2017, in the Japanese Patent Office, the disclosures of which are incorporated herein by reference.

TECHNICAL FIELD

The present invention relates to a composition, for example, an adhesive composition and the like.

BACKGROUND ART

Requirements with regard to a room temperature setting adhesive to be cured at normal temperatures for a short period of time tend to grow every year for labor saving, resource saving, energy saving, and the like. Examples of previously known room temperature setting adhesives include second generation acrylic adhesives (hereinbelow, referred to as SGA).

SGAs are two-component adhesives, but do not require for the two components to be weighed in exactly, and provide excellent working efficiency because a SGA is cured at normal temperatures in a few minutes or a few tens of minutes even when the SGA is subjected to unsatisfactory weighing in or mixing of the two components, and in some cases, a SGA is cured in such a manner, purely by contacting the two components with each other. In addition, SGAs have high impact strength of adhesive bond, a spilled-over portion of SGA is also cured well, and therefore, are suitable for adhesive bonding for assembling parts of a speaker (Patent Literature 1).

However, in these days, the curing rate is required to be in a matter of several seconds for reducing the cycle time further.

Some of ultraviolet curable adhesives is typically cured in a few seconds; however, there is a problem in that, when a portion of the ultraviolet curable adhesive is not exposed to ultraviolet ray, the portion is uncured.

Patent Literature 2 describes a two-component composition for use in temporarily fixing members, wherein a cured product of a composition for use in adhesive bonding of members is immersed in water to perform adhesive bonding of members to one another, and the adhesively bonded members are disassembled by immersing the cured product in water, and wherein the two-component composition comprises (A) a polyfunctional (meth)acrylate, (B) a monofunctional (meth)acrylate, (C) an organic peroxide, (D) a decomposition accelerator, (E) a photopolymerization initiator and (G) a particulate substance, wherein the two-component composition is divided into a first component and a second component, and the first component a contains t least (C), and the second component contains at least (D). However, Patent Literature 2 solely provides general description with regard to types of the (meth)acrylic monomers and the mixing ratio, and it is not possible to contemplate use of the above-described two-component composition for a damper material requiring a certain level of hardness.

Patent Literature 3 describes a composition, comprising a first component containing (A) a nitrile-butadiene rubber, (B) a (meth)acrylic composition, (C) a compound having an enal structure, and (F) a radical polymerization initiator, and a second component containing (A) a nitrile-butadiene rubber, (B) a (meth)acrylic composition, (D) a compound having an amine structure, and (E) a copper-containing compound. However, Patent Literature 3 also solely provides general description with regard to types of the (meth)acrylic monomers and the mixing ratio, and it is not possible to contemplate use of the above-described composition for a damper material requiring a certain level of hardness. In addition, Examples in Patent Literature 3 employ methacrylic acid, and do not employ a (meth)acrylic acid ester.

CITATION LIST

Patent Literature

Patent Literature 1: Japanese Patent Laid-Open No. 2000-159835
Patent Literature 2: International Publication No. WO 2013/039226
Patent Literature 3: International Publication No. WO 2010/041710

SUMMARY Of INVENTION

Technical Problem

In view of the fact that conventional technologies are not able to solve the above-described problems, there is a need for a composition enabling to balance, for example, the curability, the hardness and the adhesive bonding ability.

Solution to Problem

In other words, the present invention can provide the following subjects.
<1> A composition, comprising the following components (1) to (5):
(1) a polymerizable vinyl monomer containing 10 to 70 parts by mass of (1-1), 10 to 60 parts by mass of (1-2), and 10 to 60 parts by mass of (1-3) based on 100 parts by mass of (1) the polymerizable vinyl monomer, in which
(1-1) is a (meth)acrylic monomer represented by the formula (A)

$$Z\text{—}O\text{—}R^1 \qquad \text{Formula (A)}$$

(wherein, Z represents a (meth)acryloyl group, and $R^1$ represents an alkyl group),
(1-2) is a (meth)acrylic monomer represented by the formula (B)

[Formula 1]

Formula (B)

(wherein, Z and Z' represent a (meth)acryloyl group, and $R^2$ and $R^{2\prime}$ represent an alkylene group; $R^2$ and $R^{2\prime}$ may be the same as or different from one another; $R^3$ and $R^{3\prime}$ represent a hydrogen atom, or an alkyl group having 1 to 4 carbon atoms. $R^3$ and $R^{3\prime}$ may be the same as or different from one another; m and n represent an average (1-3) is a (meth)acrylic monomer that is a (meth)acrylic acid ester of a polyhydric alcohol;

(2) a thermal radical polymerization initiator;

(3) a photo-radical polymerization initiator;

(4) an aromatic amine and/or pyridine derivative; and (5) an organic metal salt.

<2> The composition according to <1>, wherein (1-3) the (meth)acrylic monomer that is a (meth)acrylic acid ester of a polyhydric alcohol is trimethylolpropane tri(meth)acrylate.

<3> The composition according to <1> or <2>, wherein (5) the organic metal salt is one or more selected from the group consisting of a β-diketone chelate, a β-ketoester chelate, and an organic acid-metal salt.

<4> A two-component composition, wherein the composition according to any one of <1> to <3> is divided into a first component and a second component, the first component contains at least (2) the thermal radical polymerization initiator, and the second component contains at least (4) the aromatic amine and/or pyridine derivative and (5) the organic metal salt.

<5> An adhesive composition, comprising the composition according to one of <1> to <4>.

<6> The adhesive composition according to <5> for use in adhesive bonding of a damper material.

<7> A bonding material for bonding an adherend by using the adhesive composition according to <5> or <6>.

<8> The bonding material according to <7>, wherein the adherend is a damper material.

Advantageous Effects of Invention

The composition of the present invention has excellent curability, adhesive bonding ability, and hardness.

DESCRIPTION OF EMBODIMENTS

Embodiments of the present invention will be described below in a detailed manner. Unless otherwise specified, numerical ranges in the present specification shall include the upper and lower limit values of the numerical range.

(1) The polymerizable vinyl monomer may be any as long as it is radically polymerizable. The polymerizable vinyl monomer is preferably a (meth)acrylic monomer. Examples of the (meth)acrylic monomer include (meth)acrylic acid derivative monomers.

It is preferable that 100 parts by mass of (1) the polymerizable vinyl monomer means 100 parts by mass with respect to the total amount of (1-1), (1-2) and (1-3) It is preferable that 100 parts by mass of (1) the polymerizable vinyl monomer means 100 parts by mass with respect to the total amount of (1) the polymerizable vinyl monomer in the first component and (1) the polymerizable vinyl monomer in the second component.

The content of the (meth)acrylic monomer is preferably 70 parts by mass or more, more preferably 85 parts by mass or more, and most preferably 100 parts by mass based on 100 parts by mass of the polymerizable vinyl monomer.

The content of (1) the polymerizable vinyl monomer is preferably 70 parts by mass or more, preferably 85 parts by mass or more, and most preferably 90 parts by mass or more based on 100 parts by mass of the composition.

(1) The polymerizable vinyl monomer used in embodiments of the present invention contains the following (1-1) to (1-3).

(1-1) is a (meth)acrylic monomer represented by form u a (A)

$$Z-O-R^1 \quad \text{Formula (A)}$$

(wherein, Z represents meth)acryloyl group, and $R^1$ represents an alkyl group).

$R^1$ may preferably be an alkyl group having 1 to 10 carbon atoms, and more preferably an alkyl group having 1 to 3 carbon atoms. When $R^1$ has 10 or less carbon atoms, the surface hardening ability is improved without being sticky, and the curing rate is improved. $R^1$ may preferably be an unsubstituted hydrocarbon group. $R^1$ may preferably be an open-chain group. $R^1$ may preferably be a saturated group.

Examples of such a (meth)acrylic monomer may include methyl (meth)acrylate, ethyl (meth)acrylate, propyl (meth)acrylate and isopropyl (meth)acrylate, and it is possible to use one or more of these. Among these, methyl (meth)acrylate is preferable because it is inexpensive and has good adhesive bonding ability.

(1-2) is a (meth)acrylic monomer represented by the formula (B)

[Formula 2]

Formula (B)

(wherein, Z and Z' represent a (meth)acryloyl group, and $R^2$ and $R^{2'}$ represent an alkylene group. $R^2$ and $R^{2'}$ may be the same as or different from one another. $R^3$ and $R^{3'}$ represent a hydrogen atom, or an alkyl group having 1 to 4 carbon atoms. $R^3$ and $R^{3'}$ may be the same as or different from one another. m and n represent an average number of moles of alkylene oxide added (proportion of alkylene oxide added)).

$R^2$ and $R^{2'}$ may preferably be an alkylene group having 2 to 6 carbon atoms, and more preferably an ethylene group having two carbon atoms. $R^3$ and $R^{3'}$ may preferably be a methyl group. m+n may preferably be 0 to 40, more preferably 1 to 30, most preferably 3 to 20, and further preferably 4 to 17. When m+n is 40 or less, the adhesive bonding ability is enhanced.

Examples of such a (meth)acrylic monomer may include 2,2-bis(4-(meth) acryloxyphenyl)propane, 2,2-bis(4-(meth) acryloxyethoxyphenyl)propane, 2,2-bis (4-(meth)acryloxydiethoxyphenyl)propane, 2,2-bis(4-(meth) acryloxypropoxyphenyl)propane, 2,2-bis(4-(meth) acryloxytetraethoxyphenyl)propane and 2,2-bis(4-(meth) acryloxypolyethoxyphenyl)propane, and it is possible to use one or more of these. Among these, in view of adhesive bonding ability and curing rate, 2,2-bis(4-(meth) acryloxypolyethoxyphenyl)propane is preferable.

(1-3) is a (meth)acrylic monomer that is a (meth)acrylic acid ester of a polyhydric alcohol.

As such a (meth)acrylic monomer, preference is given to one or more selected from the group consisting of (meth) acrylates represented by formula (C), (D), (E) or (F), for example.

[Formula 3]

Formula (C)

[Formula 4]

Formula (D)

[Formula 5]

Formula (E)

[Formula 6]

Formula (F)

[Formula 7]

Formula (G)

(wherein each $R^4$ independently represents a hydrogen atom, an alkyl group having 1 to 10 carbon atoms, or a group represented by the formula (G), and at least one of $R^4$ in the formulae (C) to (F) is a group represented by the formula (G), and each $R^5$ independently represents a hydrogen atom or an alkyl group having one or more carbon atoms, and each $R^6$ independently In the formulae (C) to (F), at least two of $R^4$ may preferably be a group represented by the formula (G). In the formulae (C) to (E), three of $R^4$ are more preferably a group represented by the formula (G).

Among these, acyclic polyfunctional (meth)acrylates are preferable. The polyfunctional (meth)acrylate means a compound having two or more (meth)acryloyl groups.

Examples of such a (meth)acrylic monomer may include trimethylolpropane tri(meth)acrylate, neopentyl glycol di(meth)acrylate, pentaerythritol tri(meth)acrylate, pentaerythritol tetra(meth)acrylate, and dipentaerythritol hexa(meth)acrylate. Among these, in view of hardness and curing rate, trimethylolpropane tri(meth)acrylate is preferable.

The amount of (1-1) used is preferably 10 to 70 parts by mass, more preferably 20 to 60 parts by mass, and most preferably 30 to 50 parts by mass based on 100 parts by mass with respect to the total amount of (1). When the amount of (1-1) used is 10 parts by mass or more, the hardness is not excessively high, and when the amount of (1-1) used is 70 parts by mass or less, the curing rate is high and the hardness is not excessively low.

The amount of (1-2) used is preferably 10 to 60 parts by mass, more preferably 17 to 50 parts by mass, and most preferably 20 to 40 parts by mass based on 100 parts by mass of (1). When the amount of (1-2) used is 10 parts by mass or more, the curing rate is high, the adhesive bonding ability is high, and the hardness is not excessively low, and when the amount of (1-2) used is 60 parts by mass or less, the hardness is not excessively low.

The amount of (1-3) used is preferably 10 to 60 parts by mass, more preferably 17 to 50 parts by mass, and most preferably 20 to 40 parts by mass based on 100 parts by mass of (1). When the amount of (1-3) used is 10 parts by mass or more, the curing rate is high, the adhesive bonding ability is high, and when the amount of (1-3) used is 60 parts by mass or less, the hardness is not excessively high, and the adhesive bonding ability is high.

(2) The thermal radical polymerization initiator used in embodiments of the present invention may preferably be an organic peroxide such as cumene hydroperoxide, p-menthane hydroperoxide, tert-butylhydroperoxide, diisopropylbenzene dihydroperoxide, methyl ethyl ketone peroxide, benzoyl peroxide, and tert-butyl peroxybenzoate, and it is possible to use one or more of these organic peroxides. Among these, cumene hydroperoxide is preferable in view of reactivity with the component (1).

The amount of the component (2) used in embodiments of the present invention is preferably 0.5 to 10 parts by mass, and more preferably 1 to 7 parts by mass, based on 100 parts by mass of the component (1). When the amount of the component (2) used in embodiments of the present invention is 0.5 parts by mass or more, the curing rate is high, and when the amount of the component (2) used in embodiments of the present invention is 10 parts by mass or less, the storage stability is good.

Examples of (3) the photo-radical polymerization initiator used in embodiments of the present invention may include benzoin derivatives such as benzyl, benzoin, benzoin benzoate, benzoin ethyl ether, benzoin isopropyl ether, and benzoin isobutyl ether; benzophenone derivatives such as benzophenone and 4-phenylbenzophenone; alkylacetophenone derivatives such as 2,2-diethoxyacetophenone and benzyl dimethyl ketal; α-hydroxyacetophenone derivatives such as 1-hydroxycyclohexyl phenyl ketone, 1-(4-isopropylphenyl)2-hydroxy-2-methylpropan-1-one, 1-(4-(2-hydroxyethoxy)-phenyl)-2-hydroxy-2-methyl-1-propan-1-one, and 2-hydroxy-2-methyl-1-phenylpropan-1-one; α-aminoalkylacetophenone derivatives such as bisdiethylaminobenzophenone, 2-methyl -1-(4-(methylthio)phenyl)-2-morpholinopropan-1-one, and 2-benzyl-2-dimethylamino -1-(4-morpholinophenyl)-1-butanon-1; acylphosphine oxide derivatives such as isobutyrylmethylphosphinic acid methyl ester, isobutyrylphenylphosphinic acid methyl ester, pivaloylphenylphosphinic acid methyl ester, 2-ethylhexanoylphenylphosphinic acid methyl ester, pivaloylphenylphosphinic acid isopropyl ester, p-toluylphenylphosphinic acid methyl ester, o-toluylphenylphosphinic acid methyl ester, 2,4-dimethylbenzoylphenylphosphinic acid methyl ester, p-tert-butylbenzoylphenylphosphinic acid isopropyl ester, pivaloyl(4-methylphenyl) phosphinic acid methyl ester, pivaloylphenylphosphinic acid vinyl ester, (meth)acryloylphenylphosphinic acid methyl ester, isobutyryldiphenylphosphine oxide, pivaloyldiphenylphosphine oxide, 1-methyl-1-cyclohexanoyldiphenylphosphine oxide, 2-ethylhexanoyl-diphenylphosphine oxide, p-toluyldiphenylphosphine oxide, o-toluyldiphenylphosphine oxide, p-tert-butylbenzoyldiphenylphosphine oxide, (meth)acryloyldiphenylphosphine oxide, benzoyldiphenylphosphine oxide, 2,2-dimethylheptanoyldiphenylphosphine oxide, terephthaloylbisdiphenylphosphine oxide, adipoylbisdiphenylphosphine oxide, 2,6-dimethylbenzoyldiphenylphosphine oxide, 2,6-dimethoxybenzoylphenylphosphinic acid methyl ester, 2,6-dimethylbenzoyldiphenylphosphine oxide, 2,6-dimethoxybenzoyldiphosphine oxide, 2,4,6-trimethylbenzoylphenylphosphinic acid methyl ester, 2,4,6-trimethylbenzoyldiphenylphosphine oxide, 2,3,6-trimethylbenzoyld iphenylphosphine oxide, 2,4,6-trimethylbenzoylitriphosphinic acid methyl ester, 2,4,6-trimethoxybenzoyldiphenylphosphine oxide, 2,6-dichlorobenzoylphenylphosphinic acid ester, 2,6-dichlorobenzoyldiphenylphosphine oxide, 2,3,4,6-tetramethylbenzoyldiphenylphosphine oxide, 2,6-dibromobenzoyldiphenylphosphine oxide, 2,6-dimethylbenzoyldiphenylphosphine oxide, 2,4,6-trimethylbenzoyldiphenylphosphine oxide, 2,4,6-trimethylbenzoylphenylphosphinic acid methyl ester, 2,6-dichlorobenzayl- or 2,6-dimethoxybenzoyldiphenylphosphine oxide, bis(2,4,6-trimethylbenzoyl)-phenylphosphine oxide, and bis(2,6-dimethoxybenzoyl)-2,4,4-trimethylpentylphosphine oxide; and oxime ester compounds such as 1,2-octanedione, 1-[-4-(phenylthio)-,2-(O-benzoyloxime)], and ethanone 1-[9-ethyl-6-(2-methylbenzoyl) -9H-carbozole-3-yl]-1-(O-acetyloxime). Among these, in view of excellent curing rate, preference is given to one or more selected from the group consisting of alkylacetophenone derivatives, α-hydroxyacetophenones, and phosphine oxides, and alkylacetophenone derivatives are more preferably. Among alkylacetophenone derivatives, benzyl dimethyl ketal is preferable. One or more of these exemplary photo-radical polymerization initiators mentioned above may be used in combination.

The amount of the component (3) used in embodiments of the present invention is preferably 0.5 to 10 parts by mass, and more preferably 1 to 7 parts by mass based on 100 parts by mass of the component (1). When the amount of the component (3) used in embodiments of the present invention is 0.5 parts by mass or more, the curing rate is high, and when the amount of the component (3) used in embodiments of the present invention is 10 parts by mass or less, the storage stability is good.

Examples of the (4) aromatic amine and/or pyridine derivative used in embodiments of the present invention are as follows. Examples of the aromatic amine include N,N-dimethylaniline, N,N-dimethyl-p-toluidine, and N,N-dioxyethyl-p-toluidine. Examples of pyridine derivatives include 2,4-pyridinediamine. One or more of these exemplary aromatic amines and/or pyridine derivatives mentioned above may be used. Among these, in view of the reactivity with the component (1), aromatic amines are preferable. Among aromatic amines, N,N-dimethylaniline is preferable.

The amount of the component (4) used is preferably 0.05 to 5 parts by mass, and more preferably 0.1 to 1 part by mass based on 100 parts by mass of the component (1). When the amount of the component (4) used is 0.05 parts by mass or more, the curing rate is high, and when the amount of the component (4) used is 5 parts by mass or less, the storage stability is good.

The organic metal salt as the component (5) used in embodiments of the present invention is preferably one or more selected from the group consisting of a β-diketone chelate, a β-ketoester chelate, and an organic acid-metal salt. The β-diketone chelate is preferably a chelate of acetylacetonate. Examples of the chelate of acetylacetonate include vanadyl acetylacetonate, cobalt acetylacetonate and copper acetylacetonate. Among chelates of acetylacetonate, vanadyl acetylacetonate is preferable. Examples of the β-ketoester chelates include chelates of ethyl acetoacetate, copper naphthenate, and vanadyl naphthenate. As the organic acid-metal salt, aliphatic carboxylic acid is preferable. Examples of the aliphatic carboxylic acids include copper 2-ethylhexylate, and vanadyl stearate. It is possible to use one or more of these exemplary organic metal salts as the component (5) mentioned above. Among these, in view of reactivity with the component (2), metal salts having reducing ability are preferable, one or more selected form the group consisting of β-diketone chelates and β-ketoester chelates are more preferable, and β-diketone chelates are most preferable.

The amount of the component (5) used is preferably 0.05 to 5 parts by mass, and more preferably 0.1 to 1 part by mass based on 100 parts by mass of the component (1). When the amount of the component (5) used is 0.05 parts by mass or more, the curing rate is high, and the adhesive bonding ability is high, and when the amount of the component (5) is 5 parts by mass or less, there is no remaining unreacted component, and the adhesive bonding ability is improved.

According to an aspect of the present invention, the composition of the present invention is used as a curable composition. According to an aspect of the present invention, the composition of the present invention is used as a curable resin composition. According to an aspect of the present invention, the composition of the present invention is used as a two-component composition. According to an aspect of the present invention, the composition of the present invention is used as an adhesive composition.

Among aspects of the present invention, in view of excellent storage stability, it is preferable to use the composition of the present invention as a two-component adhesive composition.

With regard to the two-component adhesive composition, all of essential components of the adhesive composition according to embodiments of the present invention are not mixed during storage, and the adhesive composition is divided into a first component and a second component, and for the purpose of storing the components (2), (4) and (5) separately, the first component contains at least the component (2), and the second component contains at least the component (4) and the component (5). The component (3) may be contained in any one of the first component and the second component. In this case, the first and second components may be used by applying the first and second components on an adherend simultaneously or separately to be contacted with the adherend, and subsequently, curing the first and second components, and therefore, the first and second components serve as a two-component adhesive composition.

With regard to a two-component adhesive composition, it is preferable that the first component and the second component are mixed together in a proportion (mass ratio) of 2:1 to 1:2, and it is more preferable that the first component and the second component are mixed together in a proportion (mass ratio) of 1.5:1 to 1:1.5, and it is most preferable that the first component and the second component are mixed together in a proportion (mass ratio) of 1:1.

In another aspect, a (meth)acrylic monomer and other optional component are incorporated into any one or both of the first component and the second component in advance, and by mixing the first and second components upon use of these components, it is possible to use the first component and the second component as a one-part adhesive composition.

The adhesive composition of an embodiment of the present invention may be cured by irradiation with energy rays using the following light sources.

In embodiments of the present invention, the light source for use in curing and adhesive bonding of the adhesive composition is not limited in particular; and examples of such a light source include halogen lamps, metal halide lamps, high-power metal halide lamps (containing indium and the like), low pressure mercury lamps, high pressure mercury lamps, super-high pressure mercury lamps, xenon lamps, xenon excimer lamps, xenon flash lamps, and light emitting diodes (hereinbelow, referred to as LED). These light sources are preferable because these light sources are able to provide efficient irradiation with an energy ray corresponding to a wavelength causing a reaction of each photo-radical polymerization initiator.

The above light sources differ in radiation wavelength and energy distribution. Therefore, the above light sources are appropriately selected according to a wavelength causing a reaction of the photo-radical polymerization initiator, and the like. Natural light (sunlight) may also be a light source for initiating the reaction.

The above light source may provide direct irradiation with light, irradiation with concentrated light by using a reflecting mirror and the like, or irradiation with concentrated light by using fibers and the like. It is also possible to use low-wavelength cut filters, infrared ray cut filters, cold mirrors, and the like.

When the adhesive composition is cured by irradiation with energy rays, it is preferable that the adhesive composition is cured by irradiation with energy rays at a wavelength of 365 nm and illuminance of 10 to 1000 mW/cm$^2$, and it is more preferable that the adhesive composition is cured by irradiation with energy rays at a wavelength of 365 nm and illuminance of 50 to 500 mW/cm$^2$, and it is most preferable that the adhesive composition is cured by irradiation with energy rays at a wavelength of 365 nm and illuminance of 100 to 200 mW/cm$^2$.

The composition of an embodiment of the present invention is preferably used for adhesive bonding of a damper material. The damper material in the present specification refers to a material used in a damper for a speaker. The damper for a speaker supports, for example, a diaphragm in a speaker to enable the vibration of the diaphragm. The damper for a speaker is produced by impregnating cloth made of fiber materials or like with a resin, and subsequently, molding the resulted cloth with heating. Among cloths, cotton is preferable. Among the resins, in view of molding ability, phenol resins are preferable.

Figure 1:
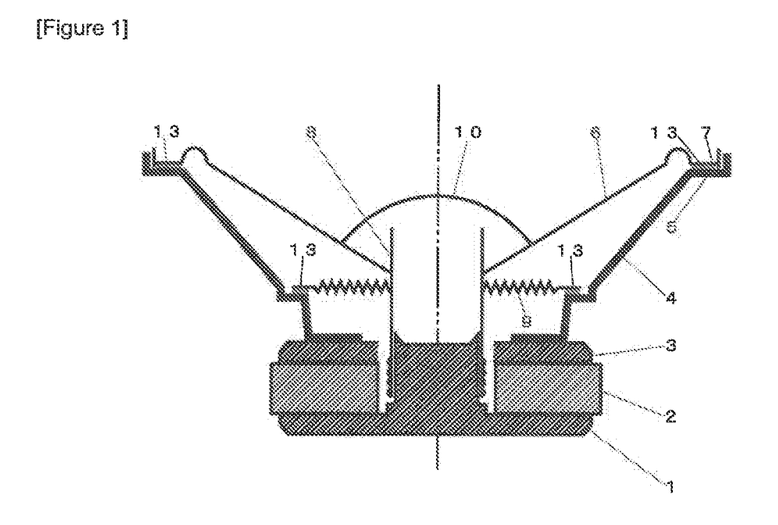
FIG. 1 shows a cross-sectional view of a speaker.

The speaker has, for example, a structure shown in FIG. 1. The speaker is constituted in such a manner that a frame 4 is joined to a field magnet obtained by stacking a bottom plate 1, a ring-shaped magnet 2 and a ring-shaped top plate 3, and subsequently adhesively bonding the stacked bottom plate 1, ring-shaped magnet 2 and ring-shaped top plate 3, and the periphery 7 of a corn 6 (corn edge) is joined to the periphery 5 of this frame 4, and a voice coil 8 is joined to the center of this corn 6, and the middle of this voice coil 8 is held by a damper 9 to fit the lower part of the voice coil 8 into the center of the bottom plate 1. The speaker is constituted by laminating a dust cap 10 on top surface located at the center of the corn 6.

Figure 2:
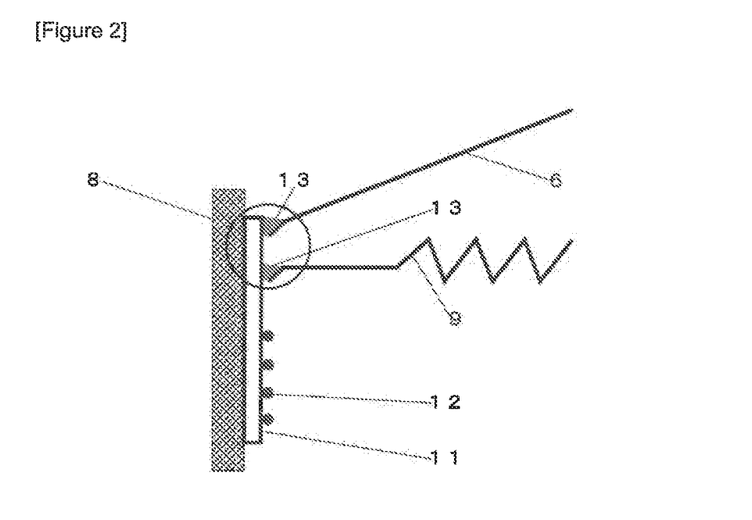
FIG. 2 shows a half sectional view illustrating a structure of "three-part point" located on a speaker.

Adhesive bonding of "three-part point" located on a speaker achieved by the corn 6, the voice coil 8 and the damper 9, is, for example, as shown in FIG. 2. The voice coil 8 is constituted in such a manner that a paper tape 11 is wound around the outer circumference of the voice coil 8, and in addition, a coil 12 is wound around the outer circumference of the paper tape 11 (in FIG. 2, the portion clearly indicated by circle represents the adhesively bonded portions as the three-part point located on a speaker. The three-part point located on the speaker is adhesively bonded by using an adhesive composition 13).

EXAMPLES

Embodiments of the present invention will be described in detail by the following Experimentation Examples. In the following description, the unit of the amount of each of the materials used is represented based on part by mass.

The materials used are shown in Tables 1 to 4.

The compositions and the materials used for the evaluation are shown below.

Materials Used

Methyl methacrylate
Methacrylic acid
2,2-bis(4-Methacryloxypolyethoxyphenyl)propane: m and n mean m and n in the formula (B). In the formula (B), Z and Z' represent a methacryloyl group, and R$^2$ and R$^{2'}$ represent an ethylene group, and R$^3$ and R$^{3'}$ represent a methyl group.
Trimethylolpropane trimethacrylate
Trimethylolpropane triacrylate
Cumene hydroperoxide
Benzyl dimethyl ketal
N,N-dimethylaniline
Vanadyl acetylacetonate
SPCC: commercially available product, steel plate subjected to SPCC-D blasting The physical properties were determined as follows. Unless otherwise specified, the measurement was performed under conditions of a temperature of 23° C. and relative humidity of 50%

Set Time

A sample was obtained by applying a mixture of a first component and a second component in equal amounts on one of damper materials, and subsequently, stacking the damper materials (a material obtained by impregnating cloth with a phenol resin. In this case, cotton was used as cloth) for laminating, followed by lamination. Immediately after the lamination (adhesively bonded area: 10 mm×10 mm), irradiation with ultraviolet rays (mercury xenon lamp: Execure 3000 manufactured by HOYA Corporation, wavelength: 365 nm, illuminance: 150 mW/cm$^2$) was performed for a predetermined time. The set time of the sample (unit: second) was determined by pulling the sample under conditions of a temperature of 23° C. and humidity of 50% using a push-pull gauge (Model S, manufactured by Komura), and measuring the time that has passed from a time point immediately after the lamination to a time point at which the strength of 2 N or more has been confirmed by the measurement.

In the set time, it is preferable in view of curability that the strength of 2 N or more is achieved within 10 seconds.

Hardness

According to JIS K 6253-3:2012, a mixture of a first component and a second component in equal amounts was applied on a circle-shaped framework (silicone sheet) having a diameter of 100 mm and a thickness of 2 mm, and PET films (188 μm) were laminated on both sides of the framework, and a resin cured for 24 hours under conditions of a temperature of 23° C. and relative humidity of 50% was subjected to the measurement under an atmosphere of the same conditions by using hardness meter (manufactured by Kobunshi Kiki Co., Ltd., durometer of type D). The measurement value obtained three seconds after the start of the measurement was recorded.

In view of the sound quality and the vibration resistance of the speaker, the hardness is preferably Shore-D hardness of 61 or more and 71 or less.

Tensile Shear Strength of Adhesive Bond (Tensile Shear Strength of Adhesive Bond) Regarding SPCC/SPCC According to JIS K 6856:1994, a sample is obtained by applying a mixture of a first component and a second component in equal amounts on one side of a test piece (100 mm×25 mm×1.6 mmt, SPCC-D subjected to sand blasting), and immediately after this, stacking the other test piece (100 mm×25 mm×1.6 mmt, SPCC-D subjected to sand blasting), followed by lamination and subsequent curing for 24 hours under conditions of a temperature of 23° C. and relative humidity of 50%. The tensile shear strength of adhesive bond (unit: MPa) of the sample was determined at a drawing speed of 10 mm/min under conditions of a temperature of 23° C. and relative humidity of 50%.

The tensile shear strength of adhesive bond is preferably 4.2 MPa or more in view of adhesive bonding ability.

Experimentation Examples 1 to 18

The materials used according to the composition in Tables 1 to 4 (shown in terms of part by mass) were mixed together to prepare an adhesive composition consisting of a first component and a second component, and the measurement results are shown in Tables 1 to 4.

TABLE 1

|  |  | Experimentation Example 1 | | Experimentation Example 2 | | Experimentation Example 3 | | Experimentation Example 4 | | Experimentation Example 5 | |
| --- | --- | --- | --- | --- | --- | --- | --- | --- | --- | --- | --- |
|  |  | First component | Second component | First component | Second component | First component | Second component | First component | Second component | First component | Second component |
| Component (1-1) | Methyl methacrylate | 40 | 40 | 40 | 40 | 40 | 40 | 40 | 40 | 25.0 | 25.0 |
| Other component | Methacrylic acid | 0 | 0 | 0 | 0 | 0 | 0 | 0 | 0 | 0 | 0 |
| Component (1-2) | 2,2-Bis(4-methacryloxy-polyethoxyphenyl)propane [m + n = 4] | 0 | 0 | 0 | 0 | 30 | 30 | 0 | 0 | 0 | 0 |
|  | 2,2-Bis(4-methacryloxy-polyethoxyphenyl)propane [m + n = 10] | 30 | 30 | 30 | 30 | 0 | 0 | 0 | 0 | 50.0 | 50.0 |
|  | 2,2-Bis(4-methacryloxy-polyethoxyphenyl)propane [m + n = 17] | 0 | 0 | 0 | 0 | 0 | 0 | 30 | 30 | 0 | 0 |
| Component (1-3) | Trimethylolpropane trimethacrylate | 30 | 30 | 0 | 0 | 30 | 30 | 30 | 30 | 25.0 | 25.0 |
|  | Trimethylolpropane triacrylate | 0 | 0 | 30 | 30 | 0 | 0 | 0 | 0 | 0 | 0 |
| Component (2) | Cumene hydroperoxide | 5 | 0 | 5 | 0 | 5 | 0 | 5 | 0 | 5 | 0 |
| Component (3) | Benzyl dimethyl ketal | 6 | 0 | 6 | 0 | 6 | 0 | 6 | 0 | 6 | 0 |
| Component (4) | N,N-dimethylaniline | 0 | 0.2 | 0 | 0.2 | 0 | 0.2 | 0 | 0.2 | 0 | 0.2 |
| Component (5) | Vanadyl acetylacetonate | 0 | 0.5 | 0 | 0.5 | 0 | 0.5 | 0 | 0.5 | 0 | 0.5 |
| Set time [second] |  | 3 | | 3 | | 2 | | 5 | | 3 | |
| Shore-D hardness |  | 66 | | 68 | | 70 | | 64 | | 70 | |
| Tensile shear strength of adhesive bond [MPa] |  | 6.3 | | 6.0 | | 7.4 | | 5.5 | | 7.2 | |
| Remarks |  | Example | | Example | | Example | | Example | | Example | |

TABLE 2

|  |  | Experimentation Example 6 | | Experimentation Example 7 | | Experimentation Example 8 | | Experimentation Example 9 | | Experimentation Example 10 | |
| --- | --- | --- | --- | --- | --- | --- | --- | --- | --- | --- | --- |
|  |  | First component | Second component | First component | Second component | First component | Second component | First component | Second component | First component | Second component |
| Component (1-1) | Methyl methacrylate | 60.0 | 60.0 | 50.0 | 50.0 | 50.0 | 50.0 | 20.0 | 20.0 | 25.0 | 25.0 |
| Other component | Methacrylic acid | 0 | 0 | 0 | 0 | 0 | 0 | 0 | 0 | 0 | 0 |
| Component (1-2) | 2,2-Bis(4-methacryloxy-polyethoxyphenyl)propane [m + n = 4] | 0 | 0 | 0 | 0 | 0 | 0 | 0 | 0 | 0 | 0 |
|  | 2,2-Bis(4-methacryloxy-polyethoxyphenyl)propane [m + n = 10] | 20.0 | 20.0 | 33.0 | 33.0 | 17.0 | 17.0 | 40.0 | 40.0 | 25.0 | 25.0 |

TABLE 2-continued

|  |  | Experimentation Example 6 | | Experimentation Example 7 | | Experimentation Example 8 | | Experimentation Example 9 | | Experimentation Example 10 | |
| --- | --- | --- | --- | --- | --- | --- | --- | --- | --- | --- | --- |
|  |  | First component | Second component | First component | Second component | First component | Second component | First component | Second component | First component | Second component |
|  | 2,2-Bis(4-methacryloxy-polyethoxyphenyl)propane [m + n = 17] | 0 | 0 | 0 | 0 | 0 | 0 | 0 | 0 | 0 | 0 |
| Component (1-3) | Trimethylolpropane trimethacrylate | 20.0 | 20.0 | 17.0 | 17.0 | 33.0 | 33.0 | 40.0 | 40.0 | 50.0 | 50.0 |
|  | Trimethylolpropane triacrylate | 0 | 0 | 0 | 0 | 0 | 0 | 0 | 0 | 0 | 0 |
| Component (2) | Cumene hydroperoxide | 5 | 0 | 5 | 0 | 5 | 0 | 5 | 0 | 5 | 0 |
| Component (3) | Benzyl dimethyl ketal | 6 | 0 | 6 | 0 | 6 | 0 | 6 | 0 | 6 | 0 |
| Component (4) | N,N-dimethylaniline | 0 | 0.2 | 0 | 0.2 | 0 | 0.2 | 0 | 0.2 | 0 | 0.2 |
| Component (5) | Vanadyl acetylacetonate | 0 | 0.5 | 0 | 0.5 | 0 | 0.5 | 0 | 0.5 | 0 | 0.5 |
| Set time [second] | | 7 | | 5 | | 6 | | 2 | | 2 | |
| Shore-D hardness | | 61 | | 64 | | 68 | | 70 | | 71 | |
| Tensile shear strength of adhesive bond [MPa] | | 6.0 | | 6.0 | | 5.7 | | 6.8 | | 5.5 | |
| Remarks | | Example | | Example | | Example | | Example | | Example | |

TABLE 3

|  |  | Experimentation Example 11 | | Experimentation Example 12 | | Experimentation Example 13 | | Experimentation Example 14 | |
| --- | --- | --- | --- | --- | --- | --- | --- | --- | --- |
|  |  | First component | Second component | First component | Second component | First component | Second component | First component | Second component |
| Component (1-1) | Methyl methacrylate | 0 | 0 | 40 | 40 | 40 | 40 | 40 | 40 |
| Other component | Methacrylic acid | 0 | 0 | 0 | 0 | 0 | 0 | 0 | 0 |
| Component (1-2) | 2,2-Bis(4-methacryloxy-polyethoxyphenyl)propane [m + n = 4] | 0 | 0 | 0 | 0 | 0 | 0 | 0 | 0 |
|  | 2,2-Bis(4-methacryloxy-polyethoxyphenyl)propane [m + n = 10] | 0 | 0 | 0 | 0 | 0 | 0 | 0 | 0 |
|  | 2,2-Bis(4-methacryloxy-polyethoxyphenyl)propane [m + n = 17] | 50 | 50 | 30 | 30 | 30 | 30 | 30 | 30 |
| Component (1-3) | Trimethylolpropane trimethacrylate | 50 | 50 | 30 | 30 | 30 | 30 | 30 | 30 |
|  | Trimethylolpropane triacrylate | 0 | 0 | 0 | 0 | 0 | 0 | 0 | 0 |
| Component (2) | Cumene hydroperoxide | 5 | 0 | 0 | 0 | 5 | 0 | 5 | 0 |
| Component (3) | Benzyl dimethyl ketal | 6 | 0 | 6 | 0 | 6 | 0 | 6 | 0 |
| Component (4) | N,N-dimethylaniline | 0 | 0.2 | 0 | 0.2 | 0 | 0.2 | 0 | 0.2 |
| Component (5) | Vanadyl acetylacetonate | 0 | 0.5 | 0 | 0.5 | 0 | 0.5 | 0 | 0.5 |
| Set time [second] | | 3 | | 7 | | 10< | | 9 | |
| Shore-D hardness | | 75 | | Uncured | | 63 | | 58 | |
| Tensile shear strength of adhesive bond [MPa] | | 2.2 | | Uncured | | 5.5 | | 7.2 | |
| Remarks | | Comparative Example | | Comparative Example | | Comparative Example | | Comparative Example | |

Uncured: due to uncured, unmeasurable.

TABLE 4

|  |  | Experimentation Example 15 | | Experimentation Example 16 | | Experimentation Example 17 | | Experimentation Example 18 | |
| --- | --- | --- | --- | --- | --- | --- | --- | --- | --- |
|  |  | First component | Second component | First component | Second component | First component | Second component | First component | Second component |
| Component (1-1) | Methyl methacrylate | 40 | 40 | 60 | 60 | 60 | 60 | 0 | 0 |
| Other component | Methacrylic acid | 0 | 0 | 0 | 0 | 0 | 0 | 60 | 60 |
| Component (1-2) | 2,2-Bis(4-methacryloxy-polyethoxyphenyl)propane [m + n = 4] | 0 | 0 | 0 | 0 | 0 | 0 | 0 | 0 |

TABLE 4-continued

| | | Experimentation Example 15 First component | Experimentation Example 15 Second component | Experimentation Example 16 First component | Experimentation Example 16 Second component | Experimentation Example 17 First component | Experimentation Example 17 Second component | Experimentation Example 18 First component | Experimentation Example 18 Second component |
|---|---|---|---|---|---|---|---|---|---|
| | 2,2-Bis(4-methacryloxy-polyethoxyphenyl)propane [m + n = 10] | 0 | 0 | 0 | 0 | 0 | 0 | 0 | 0 |
| | 2,2-Bis(4-methacryloxy-polyethoxyphenyl)propane [m + n = 17] | 30 | 30 | 40 | 40 | 0 | 0 | 0 | 0 |
| Component (1-3) | Trimethylolpropane trimethacrylate | 30 | 30 | 0 | 0 | 40 | 40 | 40 | 40 |
| | Trimethylolpropane triacrylate | 0 | 0 | 0 | 0 | 0 | 0 | 0 | 0 |
| Component (2) | Cumene hydroperoxide | 5 | 0 | 5 | 0 | 5 | 0 | 5 | 0 |
| Component (3) | Benzyl dimethyl ketal | 6 | 0 | 6 | 0 | 6 | 0 | 6 | 0 |
| Component (4) | N,N-dimethylaniline | 0 | 0.2 | 0 | 0.2 | 0 | 0.2 | 0 | 0.2 |
| Component (5) | Vanadyl acetylacetonate | 0 | 0 | 0 | 0.5 | 0 | 0.5 | 0 | 0.5 |
| Set time [second] | | 8 | | 10< | | 8 | | 6 | |
| Shore-D hardness | | Uncured | | 64 | | 68 | | 71 | |
| Tensile shear strength of adhesive bond [MPa] | | Uncured | | 4.3 | | 3.4 | | 3.7 | |
| Remarks | | Comparative Example | | Comparative Example | | Comparative Example | | Comparative Example | |

Uncured: due to uncured, unmeasurable.

The embodiments of the present invention have excellent curability and adhesive bonding ability. The embodiments of the present invention have a Shore-D (hardness) of 61 or more and 71 or less, and as a result of this, the sound quality and the vibration resistance of the speaker are excellent (Experimentation Examples 1 to 10). The performance of the embodiments of the present invention is further enhanced by adjusting the amounts of (1-1) to (1-3) used to be in a range of 30 to 50 parts by mass, a range of 20 to 40 parts by mass, and a range of 20 to 40 parts by mass, respectively (comparison of Experimentation Examples 1 to 4 to Experimentation Examples 5 to 10).

When (1-1) is not used, the hardness is excessively high, and the adhesive bonding ability is low (Experimentation Example 11). When methacrylic acid is used instead of (1-1), the adhesive bonding ability is low (Experimentation Example 18). When (1-2) is not used, the adhesive bonding ability is low (Experimentation Example 17). When (1-3) is not used, the radical photo-curability is low, and the adhesive bonding ability is low (Experimentation Example 16). When (2) is not used, curing does not occur (Experimentation Example 12). When (3) is not used, the radical photo-curability is low (Experimentation Example 13). When (4) is not used, the radical photo-curability is low, and the hardness is low (Experimentation Example 14). When (5) is not used, the curing does not occur (Experimentation Example 15).

Industrial Applicability

Embodiments of the present invention are suitable for adhesive bonding for assembling parts of a speaker, and have a high curing rate, and are able to reduce the cycle time required.

By irradiation with ultraviolet rays, the embodiments of the present invention are able to ensure strength not leading to misalignment caused by vibrations resulted from the transfer to subsequent step within several seconds, and the like, and in addition, the portions not exposed to ultraviolet rays exhibit good curability, and therefore, the embodiments of the present invention have excellent productivity.

The embodiments of the present invention may provide a composition having optimum hardness, and having excellent sound quality and vibration resistance of a speaker.

The embodiments of the present invention may provide an adhesive composition having excellent performance as an SGA adhesive, and having fast curing ability as a light curable adhesive, and provide great benefits from industrial viewpoints.

REFERENCE SIGNS LIST

1 Bottom plate
2 Magnet
3 Top plate
4 Frame
5 Periphery of frame
6 Corn
7 Periphery of corn (corn edge)
8 Voice coil
9 Damper
10 Dust cap
11 Paper tape
12 Coil
13 Adhesive composition

The invention claimed is:
1. A speaker, comprising:
a corn;
a voice coil;
a damper material; and
an adhesive composition bonded on the corn, the voice coil and the damper material;
wherein the adhesive composition excludes a (meth)acrylic acid, and the adhesive composition comprises the following components (1) to (5):
(1) a polymerizable vinyl monomer containing 10 to 70 parts by mass of (1-1), 10 to 60 parts by mass of (1-2), and 10 to 60 parts by mass of (1-3) based on 100 parts by mass of (1) the polymerizable vinyl monomer, wherein
(1-1) is a (meth)acrylic monomer represented by the formula (A)

$$Z\!-\!O\!-\!R^1 \qquad \text{Formula (A)}$$

wherein, Z represents a (meth)acryloyl group, and $R^1$ represents unsubstituted alkyl group,
(1-2) is a (meth)acrylic monomer represented by the formula (B)

Formula (B)

wherein, Z and Z' represent a (meth)acryloyl group, and $R^2$ and $R^{2'}$ represent an alkylene group; $R^2$ and $R^{2'}$ may be the same as or different from one another; $R^3$ and $R^{3'}$ represent a hydrogen atom, or an alkyl group having 1 to 4 carbon atoms; $R^3$ and $R^{3'}$ may be the same as or different from one another; m+n is in a range of 0 to 40;

(1-3) is a (meth)acrylic monomer that is a (meth)acrylic acid ester of a polyhydric alcohol;

(2) a thermal radical polymerization initiator;

(3) a photo-radical polymerization initiator;

(4) at least one of the group consisting of an aromatic amine compound and a pyridine derivative compound; and (5) an organic metal salt.

2. The speaker according to claim 1, wherein (1-3) the (meth)acrylic monomer that is a (meth)acrylic acid ester of a polyhydric alcohol is trimethylolpropane tri(meth)acrylate.

3. The speaker according to claim 1, wherein (5) the organic metal salt is one or more selected from the group consisting of a β-diketone chelate, a β-ketoester chelate, and an organic acid-metal salt.

* * * * *